Dec. 4, 1945.  G. H. GLOSS  2,390,095
PROCESS FOR MANUFACTURE OF MAGNESIUM PRODUCTS
Filed Sept. 8, 1942  2 Sheets-Sheet 2
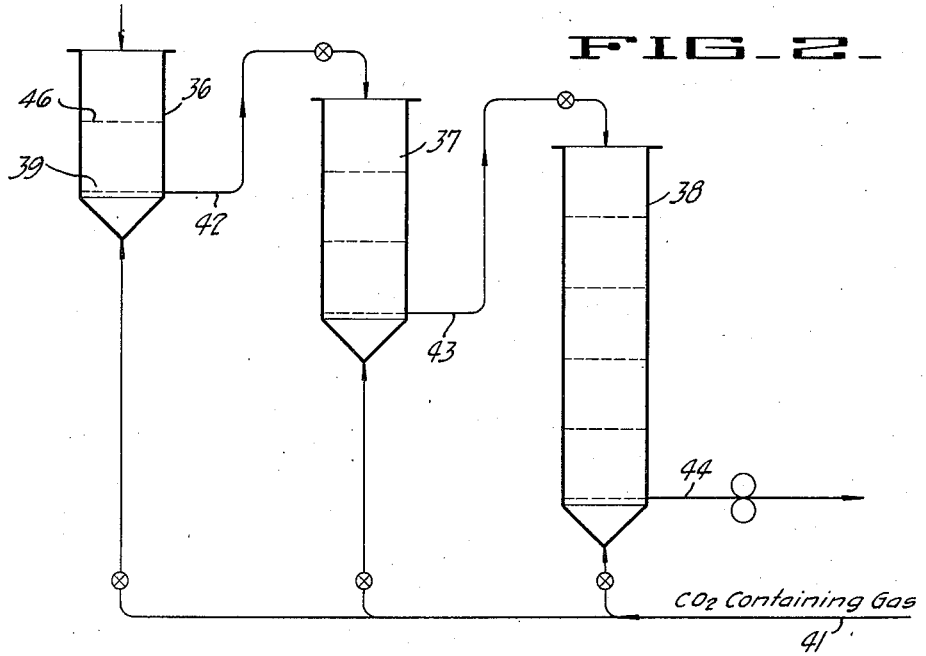
FIG_2_
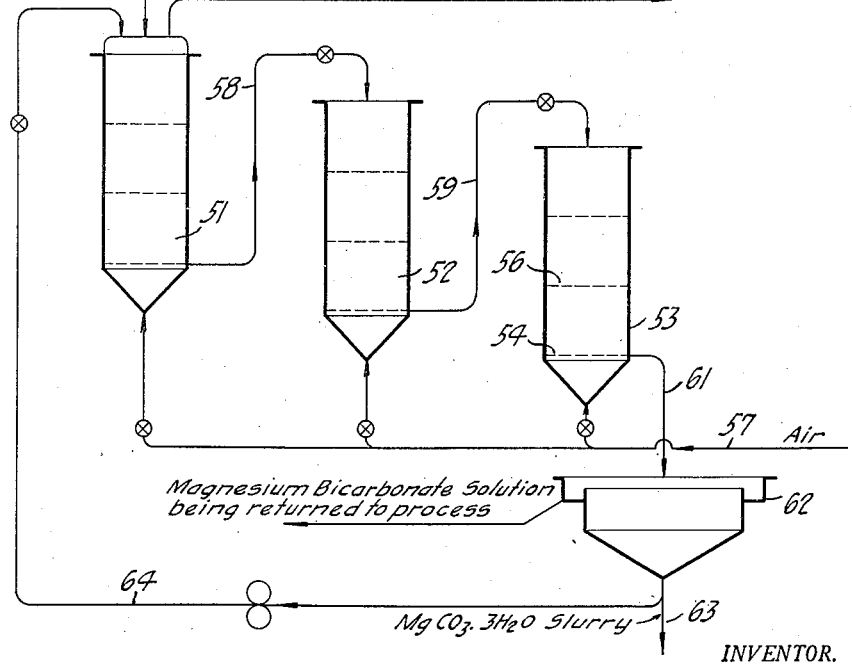
FIG_3_
INVENTOR.
Gunter H. Gloss
BY
ATTORNEY.

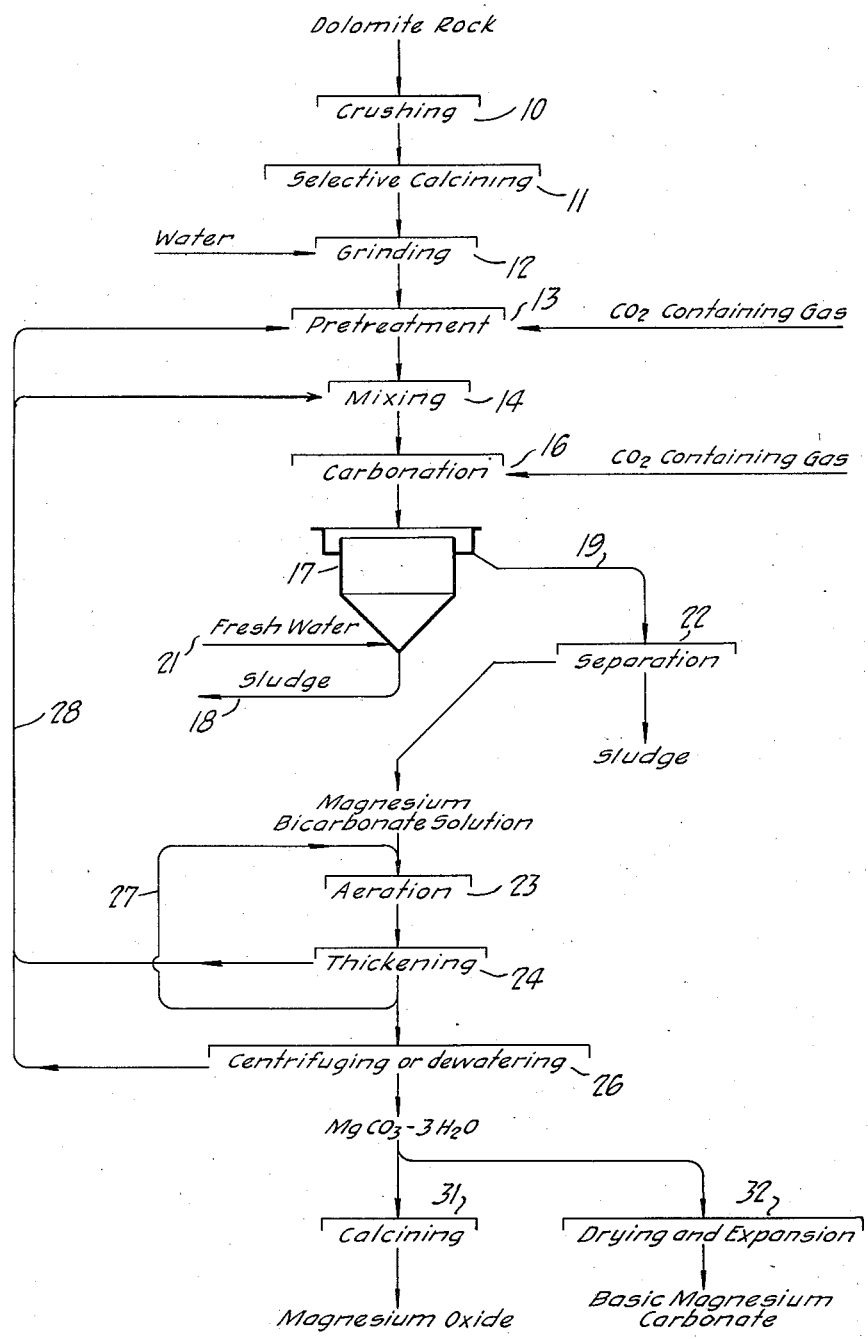

Patented Dec. 4, 1945

2,390,095

UNITED STATES PATENT OFFICE 2,390,095

PROCESS FOR MANUFACTURE OF MAGNESIUM PRODUCTS

Gunter H. Gloss, Redwood City, Calif., assignor to Marine Magnesium Products Corporation, South San Francisco, Calif., a corporation of Delaware Application September 8, 1942, Serial No. 457,643

7 Claims. (Cl. 23—67)

This invention relates generally to processes for the treatment of magnesium containing materials, such as dolomite, brucite, magnesite, serpentine, olivine, or like minerals, for the manufacture of relatively pure magnesium compounds like magnesium carbonate or magnesium oxide.

Various processes have been known for the manufacture of magnesium compounds from magnesium bearing minerals. While a number of such processes have been used commercially, they have been handicapped by relatively high cost of operation, which makes it difficult to employ them for the large scale manufacture of relatively pure compounds like magnesium oxide. For example in one such process dolomite is calcined, slaked with water, and then carbonated under pressure to form calcium carbonate and magnesium bicarbonate in solution. The magnesium bicarbonate solution is then heated by steam to an elevated temperature to form solid phase basic magnesium carbonate. While such a process does not involve complicated operations, it does require a relatively large amount of heat for converting the magnesium bicarbonate to basic carbonate, after which further heat is required to calcine the basic carbonate to magnesium oxide. Magnesium oxide obtained by calcining basic carbonate is relatively light in that it has an apparent density of the order of 5 pounds per cubic foot. In many instances a denser or heavier oxide is required.

It is an object of the present invention to provide an improved low cost process for the treatment of magnesium bearing minerals or like substances, and particularly for the effective recovery of the magnesium content in the form of a relatively pure compound. As distinguished from the type of prior art process outlined above, the present process is characterized by the fact that outside of the calcining operations no heating is required in the process, and it is possible to carry out the various operations with relatively simple equipment.

Another object of the invention is to provide an improved method for carbonating a magnesium hydroxide and/or oxide containing slurry in order to provide a magnesium bicarbonate solution for further treatment.

Another object of the invention is to provide an improved procedure for separating magnesium bicarbonate solution from sludge solids containing materials like calcium carbonate and other impurities, whereby undesired conversion of bicarbonate to solid phase neutral carbonate, is avoided.

A further object of the invention is to provide a novel procedure for the conversion of a bicarbonate solution to solid phase neutral magnesium carbonate ($MgCO_3.3H_2O$), without use of heating, and with production of relatively large sized and fast settling crystals of the solid phase material.

Another object of the invention is to provide an economical method for the aeration of magnesium bicarbonate solution to form neutral magnesium carbonate ($MgCO_3.3H_2O$), the treatment being characterized particularly by economical use of air or like dispersing gas, relative freedom from scale formation in the treatment tanks or vessels, and the production of a fast settling neutral carbonate which can be readily separated out and directly calcined to form a magnesium oxide.

Additional objects of the invention will appear from the following description in which the preferred embodiment has been set forth in conjunction with the attached drawings.

Referring to the drawings:

Fig. 1 is a flow sheet illustrating one procedure for carrying out the present invention.

Fig. 2 is a diagrammatic showing of suitable equipment for use in carrying out the carbonating operation.

Fig. 3 is a diagrammatic view showing suitable equipment for carrying out the aerating operation.

In general the process involves the preparation of a slurry containing either magnesium hydroxide, magnesium oxide, or both. Assuming that the process is applied to mineral like dolomite, the mineral is calcined to convert its magnesium content to the form of magnesium oxide, after which the calcined material is mixed with water to form a slurry. The slurry is then carbonated by contact with carbon dioxide gas, under such conditions that the magnesium content is converted to magnesium bicarbonate, without intermediate formation of solid phase neutral magnesium carbonate. After removing the magnesium bicarbonate solution from the other solid phase materials, the solution is aerated to remove a certain amount of carbon dioxide, and to thereby convert a substantial part but not all of the magnesium bicarbonate to relatively insoluble neutral magnesium carbonate. The solid phase neutral magnesium carbonate is removed from the remaining solution and treated to form other magnesium compounds, like basic magnesium carbonates or magnesium oxide, while the effluent removed from the neutral magnesium carbonate is returned back to the process.

The flow sheet illustrated in Fig. 1 shows the treatment of dolomite rock, which is a natural mineral particularly applicable to my process. According to this flow sheet the dolomite rock after being quarried is subjected to the crushing operation 10, where it is reduced to comparatively small fragments, as for example fragments measuring about ⅜ of an inch in diameter. Following crushing the material is subjected to calcining 11, which preferably is carried out selectively so that a part of the calcium carbonate is unconverted. Selective calcining can be carried out by suitable equipment such as a Nichols Herreshoff furnace, at temperatures depending upon the material being treated. For example in the calcining of a dolomitic marble from Sonora, California, the temperatures can range from 760 to 800° C. With careful selective calcining, the calcined material consists mainly of calcium carbonate, magnesium oxide, solid impurities, and a small percentage of converted calcium oxide.

Following calcining the material is subjected to grinding 12, which can be carried out by conventional apparatus, as for example a closed circuit ball mill. Sufficient water is added at this point to carry out wet grinding, consequently a considerable part of the magnesium oxide is converted to magnesium hydroxide. Good results can be secured by carrying out grinding until the particle fineness is of the order of 200 mesh.

The ground material is then subjected to pretreatment 13, which serves to convert substantially all of the calcium oxide or calcium hydroxide present, to solid phase calcium carbonate of such particle size that it can be readily removed in a later operation. This can be conveniently carried out by contacting the slurry for a short time with carbon dioxide containing gas, such as flue gas. Another suitable procedure, indicated in the drawings, is to introduce small amounts of magnesium bicarbonate solution at a relatively slow rate from an aerating operation to be presently described. The reason for this pretreatment will be presently explained. Instead of carrying out such pretreatment as a separate step, it is evident that the slurry can be contacted with carbon dioxide gas or small amounts of bicarbonate solution, to accomplish the same purpose, during the wet grinding operation 12.

Following pretreatment at 13 the slurry passes to the mixing operation 14, where it is diluted with water to form a relatively dilute slurry for the subsequent carbonating operation. For example in a typical instance when a 2.5% bicarbonate solution is to be formed by carbonation, the material before dilution can contain 50% solids, and after dilution about 3.1% solids, assuming that a dolomite containing 20% MgO is used. The subsequent carbonating operation 16 serves to convert the magnesium compounds present (magnesium hydroxide and possibly some magnesium oxide) to magnesium bicarbonate in solution. It can be carried out either continuously or by batch method, at atmospheric or higher pressures, by intimately contacting the slurry with carbon dioxide or a suitable gas like flue gas containing carbon dioxide.

It will be noted that no special slaking operation is included, for converting all of the magnesium oxide to magnesium hydroxide, before carbonation. This is because the magnesium oxide produced by selective calcining is relatively active and requires no special high temperature slaking before carbonation, even though some of the magnesium oxide may remain as such in the initial stages of carbonation.

Following carbonation the magnesium bicarbonate solution is separated from calcium carbonate and other solid phase impurities. I have found that if this separation is carried out by apparatus such as a conventional hydro-separator, a considerable amount of neutral magnesium carbonate crystallizes out in the thickened zone of solids in the lower portion of the hydro-separator chamber, above the underflow outlet. This represents a serious loss of magnesium carbonate, such as from 15 to 25% of the total magnesium oxide, and in addition it interferes with the proper operation of the hydro-separator. I have found that this difficulty can be avoided by displacing magnesium bicarbonate solution from solids in the thickened zone of the hydro-separator, by the use of fresh water. Thus in the flow sheet I have shown a hydro-separator 17 receiving all of the material from the carbonating operation 16, and serving to effect the desired separation between magnesium bicarbonate solution and sludge solids including calcium carbonate and other solid phase impurities. The sludge constitutes the underflow withdrawal 18, while the bicarbonate solution forms the overflow withdrawal 19. A stream of fresh water 21 is shown being continuously introduced into the lower conical portion of the hydro-separator at a point near the underflow outlet, preferably tangentially in order to provide a swirling motion, and the amount of fresh water is regulated to adequately displace bicarbonate solution from the settled sludge solids. As distinguished from conventional washing operations this displacement of the unstable liquid phase bicarbonate with fresh water must be substantially instantaneous. The best recoveries are therefore obtained with solid phase calcium carbonate of a fast settling nature, which is the case with a selectively calcined dolomite.

Some relatively small sized solid phase particles tend to pass out with the bicarbonate in the overflow 19. To remove these particles before further treatment, an additional step 22 of hydraulic separation can be employed.

In place of the type of separation described above, it is possible to utilize centrifuge equipment, as for example a centrifuge of the basket type, which serves to make a rapid separation between the sludge solids and the carbonate solution, so that insufficient time is afforded for any of the bicarbonate solution to crystallize out as neutral magnesium carbonate.

The clarified magnesium bicarbonate solution is now passed to the aerating operation 23, which serves to remove some carbon dioxide from the solution, to thereby form solid phase neutral magnesium carbonate. A desirable procedure for carrying out the aerating operation will be presently explained. Briefly however an inert gas like air is caused to bubble through the solution, while the solution is at relatively normal temperatures and at atmospheric pressure. Diffusion occurs whereby some carbon dioxide from the solution diffuses into the gas, and is thereby removed. Assuming that air is used as the diffusing gas, it may be desirable to reduce or remove its normal carbon dioxide content by known methods, for the last aerating stage.

At normal treatment temperatures, ranging from say 15 to 40° C. the neutral magnesium carbonate is formed as a trihydrate. If the solution during aeration is maintained at a temperature below about 15° C. then the neutral carbonate is formed as a pentahydrate. The pentahydrate has a settling rate considerably greater than the trihydrate. Following aeration the mixture of solid phase material and unconverted bicarbonate solution is subjected to the thickening operation 24, whereby the major part of the liquid is removed. The thickened slurry is then further dewatered by known methods such as by centrifuging 26.

I have found that a simple aeration operation on bicarbonate solution requires relatively large quantities of air, and the cost of compressing and blowing this air may constitute a considerable percentage of the total cost of the magnesium carbonate or oxide produced. Also there is a tendency for troublesome scale to form in the treatment tanks. As a part of the present invention I utilize a novel procedure which effects a remarkable economy in the amount of air required, which produces a neutral magnesium carbonate of large particle size with a relatively high settling rate, and which minimizes troublesome scale formation. The preferred procedure for the aerating operation will be presently described in detail. Briefly however, the procedure involves the return of a portion of the thickened neutral magesium carbonate solids from the thickening operation 24 back to the aerating operation 23, as indicated by line 27. It also involves leaving a very substantial percentage of the magnesium content of the slurry in solution as bicarbonate, with return of this solution from the thickening and centrifuging operations 24 and 26 to a point of the process ahead of the carbonating operation 16. (See line 28.)

In general the amount of solids so returned to the aerating operation may vary dependent upon various factors, particularly the concentration of the bicarbonate solution being supplied from the carbonating operation. However, with a solution containing 2.5% magnesium bicarbonate, I have secured best results by returning neutral magnesium carbonate crystals in such amounts or at such a rate that in the first stage of aeration, there will be from about 6 to 10% of neutral magnesium carbonate solids present. This quantity of re-introduced solids is about 4 to 6 times greater than the amount of neutral magnesium carbonate actually precipitated from the bicarbonate solution during aeration. Therefore this procedure is not to be confused with a normal "seeding" operation in which a small amount of crystals is introduced into a solution to provide nuclei or crystallization centers which merely initiate precipitation of far greater quantities of solids from the solution. In the present process the solid-liquid interface is vastly enlarged by the recirculation of solids whereby the neutral carbonate formed during aeration deposits as relatively thin layers over short periods of time upon the large surfaces provided by the great number of crystals already present.

The optimum amount of bicarbonate which is returned in line 28, to secure most economical aeration, is somewhat dependent upon the concentration of the bicarbonate solution received from the carbonating operation. For example where the solution contains about 2.5% of magnesium bicarbonate, I convert only about 55 to 65% of the bicarbonate to neutral magnesium carbonate, and the remaining solution (containing from 35 to 45% of the total bicarbonate received for aeration) is returned by way of line 28 to the process. Where the carbonating methods are such that a higher bicarbonate concentration is obtained, as for example of the order of 4%, then the quantity of solid phase carbonate recovered is between 75 and 80% of the total magnesium contained in the solution.

By the aerating methods described above, using bicarbonate solutions of the order of 2.5%, the amount of air employed for the aerating operation can be of the order of 4 cubic feet of free air per gallon of solution, if delivered at pressures of about 8 lbs. per square inch. This amounts to about 100 cubic feet of free air (delivered at 8 lbs. per square inch) per pound of magnesium oxide produced. As previously pointed out the air or other gas employed operates by diffusion, to effect removal of the carbon dioxide. During aeration there is no violent agitation of the bicarbonate solution, such as would require large quantities of air, but only very gentle agitation such as is occasioned by upward movement of small bubbles of air through the solution. Violent agitation such as is caused by excessive supply of air is objectionable because it materially decreases the particle size of the neutral magnesium carbonate, and in addition it causes wasteful power consumption.

After leaving the centrifuge 26 or other dewatering equipment, the neutral magnesium carbonate can be treated to form various magnesium compounds. For example it is being shown calcined at 31 to form magnesium oxide. It can also be subjected to drying and expansion at 32, to form a basic magnesium carbonate. Expansion can be carried out by heating the material to temperatures of the order of from 250 to 400° F., in conjunction with drying.

Fig. 2 shows suitable equipment for carrying out the carbonating operation. In this case three tanks 36, 37 and 38 are employed, of progressively increasing height. Each tank is equipped with a lower perforated plate or baffle 39, and carbon dioxide containing gas is introduced into the spaces below these plates, from the supply line 41. The gas can be ordinary kiln flue gas containing from 20 to 35% carbon dioxide, and preferably it includes kiln gas from the calcining operation 11. Lines 42 and 43 indicate successive flow of material (by pump or gravity) from tank 36 to 37, and from thence to the last tank 38. Material is removed from regions immediately above the perforated plates 39 and line 44 delivers the material to the separating means. Each tank is also shown provided with intermediate perforated baffles or plates 46, which serve to break up the interior of each tank into a plurality of successive treatment zones, and which permit downward progression of both solution and solids without remixture between the zones. The last tank 38 is made relatively high in order to afford a substantial pressure during the last part of the carbonating operation. For example where the last tank is about 45 feet high, the pressure in the lower portion of this tank is of the order of 20 lbs. per square inch, and final carbonation at this pressure makes possible a substantial increase in bicarbonate concentration. With the arrangement of different sized tanks illustrated, gas can be supplied to the tanks at pressures in accordance with the tank height, with the highest pressure gas being reserved for the last treatment stage. At temperatures of the order of from 15 to 25° C. such equipment can produce solutions ranging from 2.5 to 3.5% magnesium bicarbonate.

As a supplement to the equipment described in Fig. 2, it is possible to use one or more additional stages of pressure carbonation. In this event the concentration of solids in the slurry entering the carbonating operation is such as to provide sufficient magnesium oxide to produce a final bicarbonate concentration of the order of from 3.5 to 5%. These concentrations are obtained if flue gas containing about 30% carbon dioxide is employed at pressures of the order of from 50 to 75 lbs. per square inch. With application of pressure carbonation as described, the higher bicarbonate concentration obtained makes it possible to greatly increase the capacity of an existing plant. Another manner of increasing the concentration of the bicarbonate solution is to supply the last stage, as for example the tank 38, with a gas having a relatively high carbon dioxide content, as for example in the neighborhood of from 80 to 95%.

Fig. 3 shows a desirable arrangement of equipment for carrying out the aerating operation. Three treatment tanks 51, 52 and 53 are shown, with each tank having a perforated bottom plate 54, and intermediate perforated baffles 56. Line 57 serves to introduce air into the lower end of each tank. Line 58 represents removal of material from the lower portion of tank 51, at a point immediately above plate 54, for transfer by pump or gravity flow to tank 52, and line 59 similarly shows transfer from the lower part of tank 52, to tank 53. Line 61 indicates removal of material from the lower portion of tank 53 to the hydraulic thickener 62. The thickened slurry withdrawn as the underflow 63, is shown being returned in part to the first tank 51 by way of line 64. The remainder passes on for further treatment as previously described. The proportionate amount of slurry returned in this fashion is dependent upon the concentration of the magnesium bicarbonate solution, as previously pointed out.

As previously explained return of solids as described above serves to increase the size of the neutral magnesium carbonate particles, thus producing a solid phase material having a relatively high settling rate. Thus relatively large crystals of carbonate can be obtained of the order of 150 microns in length, as compared to particles of the order of 50 to 75 microns in length, without such return. In addition it has been found that this feature alone accounts for a large saving in the quantity of air employed because of the much faster deposition of neutral carbonate on the large external surface provided by the recycled solids and because of the shortened aeration time. A further important advantage obtained by this return is that scale formation, which would otherwise tend to be present, particularly in the first stage, is largely minimized if not entirely alleviated.

Some economy in the use of air is also made possible by adjusting the air supplied in each instance to the separate tanks. For example good results are obtained by adjusting the air supply on a ratio of 1, 2, and 4 for the three tanks 51, 52 and 53. In other words the rate of air supply to the first tank is made ¼ of that supplied to the last tank, and the air supply to the second tank is ½ of that supplied to the last tank. By such an adjustment in flow rates I have found it possible to effect an economy amounting to some 10 to 15% of the total volume of air employed.

Previous reference has been made to the pretreatment 13, and to the return of bicarbonate solution to the process at a point ahead of the carbonating operation, and following the pretreatment. It has been found that if the returned bicarbonate solution is suddenly contacted with a slurry containing either calcium oxide or calcium hydroxide, the formation of some solid phase calcium carbonate results, and this material is of colloidal fineness. After carbonation some of this colloidal calcium carbonate passes with the magnesium bicarbonate solution, and increases the calcium content in the final magnesium oxide. Pretreatment avoids this objectionable result because it converts the small amount of calcium oxide or calcium hydroxide present to relatively crystalline fast settling calcium carbonate, as distinguished from the extremely fine calcium carbonate which tends to result by sudden or instantaneous reaction with excessive amounts of bicarbonate.

In Fig. 3 tank 51 has been shown closed in order to permit removal of gas escaping from the surface of the liquid. This gas consists of air together with a substantial percentage of carbon dioxide. It can be advantageously reused in the process, as for example in the first carbonating tank 36, or preferably in the calcining furnaces (for carrying out selective calcining 11) in place of the customary use of air to burn the fuel employed. The latter procedure effectively increases the carbon dioxide content of the kiln gas from calcining 11, and also increases the amount of such gas available for use in the carbonating operation. In this connection note that the amount of carbon dioxide obtained from selectively calcining dolomite is insufficient for carbonation 16. Tanks 52 and 53 can be similarly enclosed and the removed gases employed in the same manner.

While many features of my process can be applied to a material like dolomite which is completely calcined, as distinguished from the selectively calcined material, the latter is advantageous for several reasons. It greatly reduces both the heat consumption for the calcining operation, and the carbon dioxide consumption for carbonation. It also facilitates carrying out carbonation at relatively low atmospheric temperatures. This can be explained by pointing out that carbonation of calcium hydroxide is an exothermic reaction. Thus when carbonation is carried out in the presence of large amounts of calcium hydroxide together with magnesium oxide or hydroxide, the calcium hydroxide is first carbonated with the result that there is a noticeable increase in temperature. An increase in temperature during carbonation is undesirable because it reduces the magnesium bicarbonate solubility. With a selectively calcined material most of the calcium content remains in its original carbonate form and therefore no such preliminary heating occurs. In addition to the foregoing with a selectively calcined material the calcium carbonate retains the particle size to which the dolomite has been ground, and therefore can be rapidly settled and separated from the bicarbonate solution after carbonation. Calcium carbonate obtained by carbonating a slurry of completely calcined and hydrated dolomite is of much smaller particle size, is slower settling and more difficult to concentrate and filter. If a considerable amount of such material is present, it also tends to build up in heavy layers in the carbonating equipment.

While my process is particularly applicable for treatment of dolomite or dolomitic materials, the process is applicable to other minerals such as magnesite, brucite, serpentine, or olivine. In the use of such materials they are first crushed, calcined, ground and then mixed with water to form a slurry for the carbonating step. Insoluble impurities such as silicates, iron, aluminum, and calcium are removed from the bicarbonate solution, and the solution then caused to yield relatively pure magnesium carbonate or oxide, as previously described. Also, certain features of the invention are applicable to the production of pure magnesium compounds from relatively impure slurries, such as slurries containing magnesium hydroxide and obtained from the precipitation of various brines.

For the aeration operation reference has been made to air as a suitable gas. Other gases can be used which do not contaminate the solid phase neutral magnesium carbonate and which will remove carbon dioxide by diffusion. Natural gas in particular can be used for this purpose. Should this gas be used for one or more of the aerating tanks, the gas leaving the tank should be collected for reuse, particularly for supplying the necessary heat for the calcining operation 11.

This application is a continuation-in-part of my copending applications Serial No. 425,240, filed Dec. 31, 1941, and Serial No. 437,106, filed Apr. 1, 1942.

I claim:

1. In a process for the manufacture of magnesium compounds wherein neutral magnesium carbonate is precipitated from a magnesium bicarbonate solution, the steps of continually supplying the solution to a retained quantity of the same, continually introducing a relatively inert gas into the solution to aerate the same, the rate of introduction of the gas being sufficient to cause removal of carbon dioxide from the solution with precipitation of neutral magnesium carbonate without causing violent agitation, continually removing a suspension of solid phase neutral magnesium carbonate of a desired average particle size from the quantity of solution undergoing treatment, and continually reintroducing solid phase neutral magnesium carbonate back into the solution undergoing treatment in substantial amounts sufficient to produce neutral magnesium carbonate of a desired average particle size and in an amount substantially greater than the amount of neutral magnesium carbonate freshly precipitated in the presence of the reintroduced neutral magnesium carbonate, said last named step serving to cause formation of relatively large sized particles of precipitated neutral magnesium carbonate and also causing a saving in the amount of inert gas required.

2. In a process as in claim 1 in which the amount of solid phase neutral magnesium carbonate reintroduced to the quantity of solution undergoing treatment is 4 to 6 times the quantity of neutral magnesium carbonate freshly precipitated in the presence of the reintroduced neutral magnesium carbonate.

3. In a process for the manufacture of magnesium compounds from magnesium containing materials capable of being calcined to provide magnesium oxide, the steps of calcining the material to form a magnesium oxide content, forming an aqueous slurry of the calcined material, carbonating the slurry to convert the magnesium content to magnesium bicarbonate in solution, removing the magnesium bicarbonate solution from the solid phase material, continually supplying the solution to a retained quantity of the same, continually introducing a relatively inert gas into the solution to aerate the same, the rate of introduction of the gas being sufficient to cause removal of carbon dioxide from the solution with precipitation of neutral magnesium carbonate without causing violent agitation, continually removing a suspension of neutral magnesium carbonate of desired average particle size from the quantity of solution undergoing treatment, and continually reintroducing solid phase neutral magnesium carbonate back into the solution undergoing treatment in substantial amounts sufficient to produce neutral magnesium carbonate of a desired average particle size and in an amount substantially greater than the amount of neutral magnesium carbonate freshly precipitated in the presence of the reintroduced neutral magnesium carbonate.

4. In a process for the manufacture of magnesium compounds from magnesium containing materials capable of providing a magnesium oxide content upon calcination, the steps of calcining the material to provide a magnesium oxide content, forming an aqueous slurry from the calcined material, carbonating the slurry to convert the magnesium content to magnesium bicarbonate in solution, removing the magnesium bicarbonate solution from solid phase material, continually supplying the solution to a retained quantity of the same, continually aerating the solution by introducing a relatively inert gas into the same, the rate of introduction of the gas being sufficient to cause removal of carbon dioxide gas from the solution with precipitation of neutral magnesium carbonate without causing violent agitation, continually removing a suspension of solid phase neutral magnesium carbonate of a desired average particle size from the quantity of solution undergoing treatment, continually reintroducing solid phase neutral magnesium carbonate back into the solution undergoing treatment in substantial amounts sufficient to produce neutral magnesium carbonate of a desired average particle size and in an amount substantially greater than the amount of neutral magnesium carbonate freshly precipitated in the presence of the reintroduced neutral magnesium carbonate, removing an effluent from the solution undergoing treatment with the effluent having a substantially residual magnesium bicarbonate content, and reintroducing such effluent back into the process ahead of the carbonating operation.

5. In a process for the manufacture of magnesium compounds, wherein there is formed an aqueous slurry containing solid phase magnesium hydroxide, the steps of contacting the slurry with a carbon dioxide containing gas to convert the magnesium content to magnesium bicarbonate in solution, removing the magnesium bicarbonate solution from solid phase material, continually supplying the solution to a retained quantity of the same, continually introducing relatively inert gas into the solution to aerate the same, the rate of introduction of the gas being sufficient to cause removal of carbon dioxide from the solution with precipitation of neutral magnesium carbonate without causing violent agitation, continually removing a suspension of solid phase neutral magnesium carbonate of a desired average particle size from the quantity of solution undergoing treatment, continually reintroducing solid phase magnesium carbonate back into the solution undergoing treatment in substantial amounts sufficient to produce neutral magnesium carbonate of a desired average particle size and in an amount substantially greater than the amount of neutral magnesium carbonate freshly precipitated in the presence of the reintroduced neutral magnesium carbonate, said last step serving to cause formation of relatively large size particles of precipitated neutral magnesium carbonate and also causing a saving in the amount of inert gas required and an increase in the carbon dioxide content of the gas discharging from the solution undergoing treatment, and collecting and utilizing the mixture of the inert gas and carbon dioxide discharged from the solution undergoing treatment for supplying carbon dioxide to said carbonating operation.

6. In a process for the manufacture of magnesium compounds wherein neutral magnesium carbonate is precipitated from magnesium bicarbonate solution, the steps of continually supplying the solution to the first of a series of treatment zones in which quantities of the solution are retained, continually introducing a relatively inert gas into the solution in said zones to aerate the same and to cause precipitation of solid phase neutral magnesium carbonate, the rate of introduction of the gas being sufficient to cause removal of carbon dioxide from the solution with precipitation of neutral magnesium carbonate without causing violent agitation, supplying material from each zone, except the last, to the next zone in the series, the material comprising effluent together with precipitated neutral magnesium carbonate, continually removing neutral magnesium carbonate of desired average particle size and effluent from the last zone of the series, subjecting the same to separation wherein water containing residual magnesium bicarbonate is largely recovered in an overflow and neutral magnesium carbonate is removed in an underflow, and continually reintroducing a substantial amount of the neutral magnesium carbonate of the underflow to the first zone of the series sufficient to produce neutral magnesium carbonate of desired average particle size in said last zone and in an amount substantially greater than the amount of neutral magnesium carbonate freshly precipitated in said zones in the presence of the reintroduced neutral magnesium carbonate.

7. In a process for the manufacture of magnesium compounds wherein neutral magnesium carbonate is precipitated from magnesium bicarbonate solution, the steps of continually supplying the solution to the first of a series of treatment zones in which quantities of the solution are retained, continually introducing a relatively inert gas into the solution in said zones to aerate the same and to cause precipitation of solid phase neutral magnesium carbonate, the rate of introduction of the gas being sufficient to cause removal of carbon dioxide from the solution with precipitation of neutral magnesium carbonate without causing violent agitation, supplying material from each zone, except the last, to the next zone in the series, the material comprising effluent together with precipitated neutral magnesium carbonate, continually removing neutral magnesium carbonate of desired average particle size and effluent from the last zone of the series, subjecting the same to separation wherein water containing residual magnesium bicarbonate is largely recovered in an overflow and neutral magnesium carbonate is removed in an underflow, continually reintroducing a substantial amount of the neutral magnesium carbonate of the underflow to the first zone of the series sufficient to produce neutral magnesium carbonate of desired average particle size in said last zone and in an amount substantially greater than the amount of neutral magnesium carbonate freshly precipitated in said zones in the presence of the reintroduced neutral magnesium carbonate, the amount of inert gas utilized in the successive zones being least for the first zone and progressively greater for the latter zones so as to discharge air rich in carbon dioxide from said first zone, and utilizing the carbon dioxide of the air from said first zone in the production of said magnesium bicarbonate solution.

GUNTER H. GLOSS.